April 26, 1938. I. SALVONI 2,115,499

PROTECTIVE DEVICE FOR SYSTEMS OF WATER SUPPLY

Original Filed June 26, 1936

INVENTOR
Oppolito Salvoni
BY
ATTORNEY

Patented Apr. 26, 1938

2,115,499

UNITED STATES PATENT OFFICE

2,115,499

PROTECTIVE DEVICE FOR SYSTEMS OF WATER SUPPLY

Ippolito Salvoni, New York, N. Y., assignor of forty-four percent to Riccardo Salmona, New York, N. Y., and twelve percent to Edward Q. Jackson, Jackson Heights, N. Y.

Original application June 26, 1936, Serial No. 87,376. Divided and this application July 24, 1936, Serial No. 92,297

6 Claims. (Cl. 137—69)

This invention relates to plumbing accessories and more particularly refers to improvements in devices for protecting water against pollution through back siphonage or intermingling with water coming from an unsafe source.

In the installation of bathroom and other appliances, it frequently happens that the discharge outlet for the water supplied by the city system projects within the basin or other appliance to a point lower than the level that might be reached by the water within the basin or other appliance. In such cases there is the ever present possibility of the unclean water contained in the basin or other appliances reaching the supply system through back siphonage induced by a vacuum or a reduction in pressure occurring in the supply system.

In certain types of appliances where water is admitted to a basin or trough from the bottom thereof, there is also the possibility for the unclean water reaching the supply system through seepage by gravity.

In some types of installations, water may be caused to reach the basin or other appliance from two different sources through a common discharge outlet, the arrangement forming a so called direct cross connection. This is the case, for instance, in shower baths where water is supplied through a common outlet from both a source of cold and a source of hot water supply.

If the hot water is originally obtained from the same system which supplies the cold water, or in other words, if both waters are safe, no danger of pollution of one water supply from the other exists. However, very frequently the water flowing through the hot water system is not derived from the same source as the cold water but is obtained from a cistern or from some other source which may be unsafe.

Very frequently water from a cistern is used for supplying hot water in a building, especially where the city water happens to be hard and unsuited for use in the boilers. Such water is used mainly for washing dishes and utensils and bathing but is unfit for drinking and cooking. At times the hot water, although derived from the safe water supply is subjected to some softening treatment that will make it objectionable for use except for washing and bathing. Under these conditions, with a direct connection between the hot and cold water systems, the cold water might become contaminated from the hot water intermingling therewith whenever a vacuum or a reduction in pressure should occur in the cold water system.

The primary object of this invention is to provide a vacuum breaker of a novel and improved construction adapted to positively prevent contamination of the water supply through back siphonage by the contents of a plumbing appliance served thereby.

Another object is to provide a novel and improved type of vacuum breaker adapted to prevent contamination of the water supply through back siphonage from the contents of a plumbing appliance served thereby and also adapted to prevent contamination through seepage of the unclean water by gravity into the supply system.

A further object is to provide a plumbing accessory adapted for insertion in a water supply system where a direct cross connection exists with another unsafe water supply system, said accessory being in the form of a unit comprising a system of vacuum breaker and check valves, adapted to positively prevent contamination of the safe by the unsafe water supply.

A still further object is to provide, in a vacuum breaker comprising a valve controlled air inlet, and a water inlet and outlet, novel and improved means governed by the water flowing through the device for actuating the air valve.

Other objects and advantages of the present invention will more fully appear as the description proceeds and will be set forth and claimed in the appended claims.

My invention is illustrated by way of example in the accompanying drawing, in which.

Devices embodying my invention have already been described but not separately claimed, in connection with a bidet forming the subject of an application entitled "Bidet with safety water supply arrangement", Serial No. 87,376, copending herewith. Therefore, the present application should be considered as a division thereof.

Figure 2:
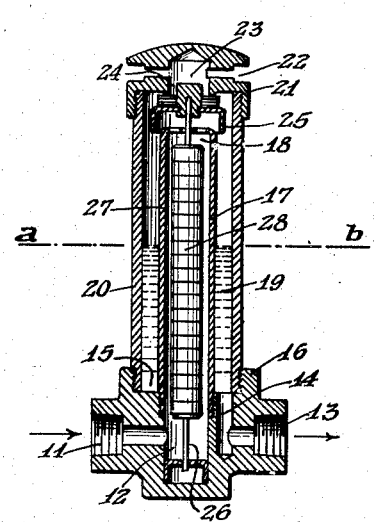
Fig. 2 is a vertical sectional view of the same taken through line 2—2 of Fig. 1.
Figure 1:
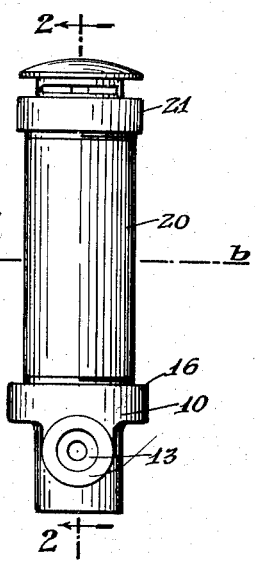
Fig. 1 is a front view in elevation of a vacuum breaker embodying my invention.

Referring to Figs. 1 and 2 of the drawing it is seen that my improved vacuum breaker comprises a fitting 10 forming the base portion thereof, said fitting having a threaded inlet 11 leading to a well 12 and a threaded outlet 13 communicating with an upwardly directed passage 14 leading to the top surface 15 of the fitting, said top surface being surrounded by an internally threaded vertically extending flange 16.

Well 12 is provided with a tubular riser 17 vertically extending therefrom. At the top, said riser is provided with perforations 18 through which water coming from inlet 11 can pass and reach an annular chamber 19 surrounding riser 17, said annular chamber being formed by another tubular member 20 vertically extending from the top 15 of the fitting, the lower end of said member 20 being screwed within flange 16.

The upper end of tubular member 20 is closed by a cap 21 having a number of laterally extending air inlets 22 leading to an air chamber 23 having an outlet 24 opening into chamber 19. Said outlet 24 is normally open and is controlled by a valve 25 carried by a stem 26 extending through the top of and within tubular chamber 27 formed by riser 17. The portion of said stem within the said chamber 27 is provided with a series of disks 28 of buoyant material such as cork, for instance, acting as a float so that when water is admitted to chamber 27 and rises within said chamber to flow through openings 18 at the top, said float will cause valve 25 to rise to a position where it will close outlet 24, as shown in Fig. 2.

When the water ceases to flow, the weight of valve 25 and parts attached thereto will cause said valve to drop so that the air passages 22, 23, 24 will remain open. From annular chamber 19 water can reach the outlet 13 by means of passage 14, as will be understood. In practice the device is installed in a pipe line leading to an appliance to be served thereby or else is connected to the appliance direct so that the upper end of the device remains well above the line of maximum level that can be reached by the liquid in the basin or trough or other receptacle of the appliance served thereby, said maximum level line being represented in the figures by lines a—b.

The device can then function as an air break between the appliance and the supply line so that in case a vacuum should at any time be formed in the supply line, the air sucked through passages 22, 23, 24 would prevent siphonage of the contents of said basin or trough through the discharge outlet leading water to said basin or trough, in case said discharge outlet should happen to be submerged.

The fact that before the water can reach chamber 19, chamber 27 must be entirely flooded, renders the device immediately responsive and positive in action, because as soon as water reaches chamber 27 the float 28 forces valve 25 to its closing position with a force increasing with the rising of the water within chamber 27 until it reaches the top thereof to be discharged through openings 18.

The device as designed will also effectively prevent the possibility of contamination of the water supply by unclean water from the appliance reaching the supply line by gravity, due to the fact that not only the air inlets but also the upper end of riser 17 through which the water must flow before reaching outlet 13 is caused to extend upwardly to a point where it remains at a level immediately higher than that of the maximum liquid level line a—b.

Figure 3:
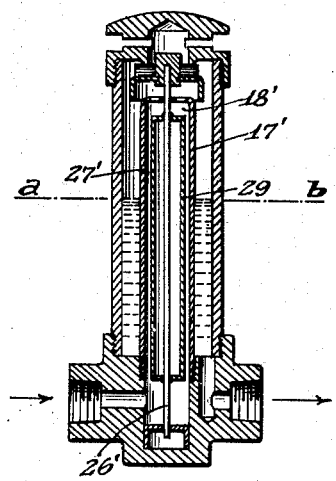
Fig. 3 is a vertical sectional view similar to that of Fig. 2 illustrating an alternative form of my device.

The buoyancy of the valve controlling the air inlet of the device need not necessarily be provided in the manner shown in Fig. 2. For instance, in place of the cork disks shown at 28 in Fig. 2, the stem 26' of the valve can be equipped with an elongated hollow member 29 as shown in Fig. 3, said member 28 providing the necessary buoyancy and forming with the inner surface of riser 17' an annular chamber 27' allowing the water to reach the openings 18' at the top of the riser.

Where the hot water is obtained from an unsafe source and a direct cross connection between the hot and cold water pipes exists, it is necessary to make provisions in order to prevent contamination of the safe by the unsafe water supply.

A fair amount of protection can be obtained by inserting a check valve, or preferably two check valves in series, in the safe water pipe leading to the direct cross connection, said valve or valves preventing the return flow of the water and therefore preventing water from the unsafe source of supply reaching the safe water supply. On the other hand, check valves cannot absolutely be relied upon when water merely seeps through due to leaking valves, therefore, additional safety provisions should preferably be made.

Figure 4:
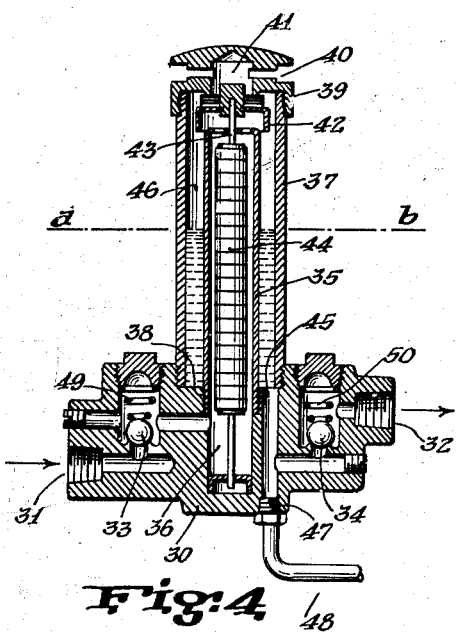
Fig. 4 is a vertical sectional view of a device similar to that shown in Fig. 2 with the addition of check valve means for preventing back flow.

A preferred type of unit for preventing contamination of the safe by the unsafe water supply through a direct connection is illustrated in Fig. 4. Said unit, which should preferably be inserted in the safe water line between the valve controlling said line and the point where said line connects with the unsafe water line, comprises a body or fitting 30 having an inlet 31 and an outlet 32, a check valve 33 at the inlet end, a check valve 34 at the outlet end, and an air break similar to that previously described interposed between the two check valves.

Like in the previous case, the air break comprises a tubular member 35 upwardly extending from the well 36, another tubular member 37 concentric therewith upwardly extending from the top surface 38 of the fitting, a cap 39 provided with air inlets 40, 41 for said member 37 and a valve 42 carried by stem 43 and actuated by a float 44 controlling said air inlets.

The passage 45 leading from the annular chamber 46 between members 35 and 37, to outlet 32 through check valve 34 is extended downwardly to an outlet 47 to which may be connected a bleeder pipe 48. By virtue of this arrangement if for any reason water from the outlet end should have a chance to leak through valve 34 it would collect within passage 45 and would be discharged through bleeder pipe 48, it being understood that said bleeder pipe will lead to a point of discharge where it cannot be submerged.

The function of the additional air break is to prevent such conditions as might arise if a vacuum exists on the safe water line while the safe water control valve is open and the check valves leak. In this case, unsafe water might be pulled back unless an air break is installed between the two check valves thus preventing the formation of a negative pressure at the bleeder pipe. Unless the air break is installed the formation of a vacuum between the two check valves might cause the unsafe water leaking through the check valve to be pulled back with the air coming up through the bleeder.

The check valves are shown of the ball type although it must be understood that any suitable type of check valve can be employed. Each check valve preferably tends to maintain its closed position by gravity, as check valves that depend exclusively upon the action of a spring holding the valve against its seat are not reliable and are generally objected to by various boards of health. However, while I use check valves actuated by gravity, I prefer to also utilize the action of a spring pressing the valve against its seat in order to minimize the danger of leakages, as shown at 49, 50, in Fig. 4.

From the foregoing, it will be seen that I provide a novel and improved type of vacuum breaker which may or may not be combined into a single unit with a check valve or valves, according to the use for which the device is intended.

The constructional details of my device may vary from those shown without departing from the inventive idea. The drawing is therefore to be understood as being intended for illustrative purpose only and not in a limiting sense. Accordingly, I reserve the right to carry my invention into practice in all those ways and manners which may enter, fairly, into the scope of the appended claims.

I claim:

1. In the combination of a receptacle and a water supply pipe therefor, a device for preventing the back flow of liquid from said receptacle to the supply pipe comprising a body having an inlet and an outlet, a liquid receiving chamber communicating with said inlet upwardly extending from said body to a level substantially above the maximum water level in the receptacle having openings at its upper end, a tubular member concentric therewith also upwardly extending from said body, said tubular member forming with said receiving chamber an annular liquid discharging chamber communicating with said outlet, a cap provided with an air inlet, mounted at the upper end of said tubular member, a valve controlling said air inlet, a stem carrying said valve projecting within and axially slidable with respect to said receiving chamber and a buoyant member within said receiving chamber, carried by said stem, said buoyant member actuating said valve to close said air inlet before the liquid supplied to said receiving chamber reaches the upper end thereof.

2. A device of the class described comprising a body having an inlet and an outlet, a liquid receiving chamber communicating with said inlet upwardly extending from said body, a liquid discharging chamber communicating with the upper end of said liquid receiving chamber also upwardly extending from said body, the lower end of said discharging chamber communicating with said outlet, an inlet for admitting air to either chamber, a valve having buoyant means responsive to the action of liquid flowing through said chambers, to close said air inlet, a check valve interposed between said discharging chamber and said outlet, preventing back flow of liquid from the latter to the former, and a bleeder pipe outlet interposed between said check valve and said discharging chamber.

3. In the combination of a receptacle and a water supply pipe therefor, a device for preventing the back flow of liquid from said receptacle to the supply pipe comprising a body having an inlet and an outlet, a liquid receiving chamber communicating with said inlet upwardly extending from said body to a level substantially above the maximum water level in the receptacle, a liquid discharging chamber communicating with the upper end of said liquid receiving chamber also upwardly extending from said body, the lower end of said discharging chamber communicating with said outlet, an inlet for admitting air to either chamber, a valve controlling said air inlet, buoyant means within said receiving chamber, responsive to the action of liquid flowing through said receiving chamber, buoyant means actuating said valve to close said air inlet before the liquid supplied to said receiving chamber reaches the upper end thereof, a check valve interposed between said discharging chamber and said outlet, and a check valve interposed between said receiving chamber and said inlet, said check valves preventing back flow of liquid from said outlet to said inlet.

4. A device of the class described comprising a body having an inlet and an outlet, a liquid receiving chamber communicating with said inlet upwardly extending from said body, a liquid discharging chamber communicating with the upper end of said liquid receiving chamber also upwardly extending from said body, the lower end of said discharging chamber communicating with said outlet, an inlet for admitting air to either chamber, a valve having buoyant means responsive to the action of liquid flowing through said chambers, to close said air inlet, a check valve interposed between said discharging chamber and said outlet, a check valve interposed between said receiving chamber and said inlet, said check valves preventing back flow of liquid from said outlet to said inlet, and a bleeder pipe outlet interposed between said first mentioned check valve and said discharging chamber.

5. A device of the class described comprising a body having an inlet and an outlet, a liquid receiving chamber communicating with said inlet upwardly extending from said body, having openings at its upper end, a tubular member concentric therewith also upwardly extending from said body, said tubular member forming with said receiving chamber an annular liquid discharging chamber communicating with said outlet, a cap provided with an air inlet, mounted at the upper end of said tubular member, a valve controlling said air inlet responsive to the action of liquid flowing within said receiving chamber to close said air inlet, a check valve interposed between said discharging chamber and said outlet, a check valve interposed between said receiving chamber and said inlet, said check valves preventing back flow of liquid from said outlet to said inlet, and a bleeder pipe outlet interposed between said first mentioned check valve and said discharging chamber.

6. A device of the class described comprising a body having an inlet and an outlet, two check valves inserted in series therebetween, preventing back flow of liquid from said outlet to said inlet, an air break and a bleeder pipe outlet interposed between said two check valves, and a valve responsive to the action of liquid flowing from said inlet to said outlet, controlling said air break.

IPPOLITO SALVONI.